United States Patent [19]

Moriyama et al.

[11] Patent Number: 5,151,791
[45] Date of Patent: Sep. 29, 1992

[54] EFFICIENT ENCODING OF PICTURE SIGNAL

[75] Inventors: Yoshiaki Moriyama; Satomi Kobayashi, both of Tokorozawa, Japan

[73] Assignee: Pioneer Electronic Corporation, Tokyo, Japan

[21] Appl. No.: 587,006

[22] Filed: Sep. 24, 1990

[30] Foreign Application Priority Data

Sep. 26, 1989 [JP] Japan ............................ 1-251138

[51] Int. Cl.$^5$ ............................................. H04N 1/41
[52] U.S. Cl. .................................. 358/261.2; 358/426; 358/430
[58] Field of Search ............ 358/426, 430, 432, 261.2, 358/261.3

[56] References Cited

U.S. PATENT DOCUMENTS

| | | | |
|---|---|---|---|
| 4,144,547 | 3/1979 | Stoffel | 358/430 |
| 4,200,886 | 4/1980 | Musmann et al. | 358/261.2 |
| 4,344,086 | 8/1982 | Mizuno | 358/261.2 |
| 4,386,366 | 5/1983 | Mori | 358/430 |
| 4,633,325 | 12/1986 | Usubuchi | 358/430 |
| 4,656,500 | 4/1987 | Mori | 358/430 |
| 4,698,672 | 10/1987 | Chen et al. | 358/261.2 |
| 4,811,112 | 3/1989 | Rutledge | 358/261.2 |
| 4,831,636 | 5/1989 | Taniguchi et al. | 358/430 |
| 5,007,102 | 4/1991 | Haskell | 358/261.2 |

Primary Examiner—Edward L. Coles, Sr.
Assistant Examiner—Thomas L. Stoll
Attorney, Agent, or Firm—Perman & Green

[57] ABSTRACT

A picture signal encoding of a predictive encoding type. The encoding process is performed so that a summation between a quantized error of codes respectively representing at least two slots in one of N (N is an integer greater than 1) quantizing patterns, for current value data and a quantized error to be obtained when next value data is coded according to at least two quantizing patterns.

12 Claims, 5 Drawing Sheets

| RANGE | PREDICTIVE ERROR (UPPER ROW) / REPRESENTATION VALUE (LOWER ROW) | | | | | | | |
|---|---|---|---|---|---|---|---|---|
| 0 | -10~-8 (-9) | -7~-5 (-6) | -4~-2 (-3) | -1~1 (0) | 2~4 (3) | 5~7 (6) | 8~10 (9) | (0) |
| 0.5 | -13~-10 (-12) | -9~-6 (-8) | -5~-2 (-4) | -1~1 (0) | 2~5 (4) | 6~9 (8) | 10~13 (12) | (0) |
| 1 | -20~-15 (-18) | -14~-9 (-12) | -8~-3 (-6) | -2~2 (0) | 3~8 (6) | 9~14 (12) | 15~20 (18) | (0) |
| 1.5 | -27~-20 (-24) | -19~-12 (-16) | -11~-4 (-8) | -3~3 (0) | 4~11 (8) | 12~19 (16) | 20~27 (24) | (0) |
| 2 | -41~-30 (-36) | -29~-18 (-24) | -17~-6 (-12) | -5~5 (0) | 6~17 (12) | 18~29 (24) | 30~41 (36) | (0) |
| 3 | -55~-40 (-48) | -39~-24 (-32) | -23~-8 (-16) | -7~7 (0) | 8~23 (16) | 24~39 (32) | 40~55 (48) | (0) |
| 4 | -83~-60 (-72) | -59~-36 (-48) | -35~-12 (-24) | -11~11 (0) | 12~35 (24) | 36~59 (48) | 60~83 (72) | (0) |
| 5 | -111~-80 (-96) | -79~-48 (-64) | -47~-16 (-32) | -15~15 (0) | 16~47 (32) | 48~79 (64) | 80~111 (96) | (0) |
| 6 | -167~-120 (-144) | -119~-72 (-96) | -71~-24 (-48) | -23~23 (0) | 24~71 (48) | 72~119 (96) | 120~167 (144) | (0) |
| 7 | -256~-160 (-192) | -159~-96 (-128) | -95~-32 (-64) | -31~31 (0) | 32~95 (64) | 96~159 (128) | 160~255 (192) | (0) |
| | 000 | 001 | 010 | 011 | 100 | 101 | 110 | 111 |
| | CODE ($y_n$, $r_1$) | | | | | | | |

Fig. 3B

| CODE $y_i$ | 011 | 001, 010, 100, 101 | 000, 110 | 111 |
|---|---|---|---|---|
| RANGE $r_{i+1}$ | TWO LEVELS BELOW $r_i$ | $r_i$ | TWO LEVELS ABOVE $r_i$ | $r_{max}$ |

WHERE $r_{min}$ IS A RANGE 4 LEVELS ABOVE $r_{max}$, $r_{min} \leq r_i$, $r_{i+1} \leq r_{max}$

EFFICIENT ENCODING OF PICTURE SIGNAL

BACKGROUND OF THE INVENTION

1. Field of the Invention

The present invention relates to encoding of picture signals, and more particularly to the so-called efficient picture encoding.

2. Description of Background Information

The predictive encoding such as DPCM, quasi-instantaneous companding DPCM, and ADPCM is known as the so-called efficient picture encoding in which the average bit number per picture element, or sampled value, is reduced for the purpose of data compression.

In general, there is a correlation of a large degree between adjacent picture elements in the case of ordinary pictures. For instance, when the sampling of a video signal is performed, there will be only a small difference between successive two of a plurality of sampled values obtained consecutively. The predictive encoding scheme utilizes this statistical characteristic, in such a manner that a prediction error is generated between the current value of a picture element and a predicted value obtained by predicting a current value of the picture element using a former value of the picture element, and the prediction error is converted to code data.

Figure 1:
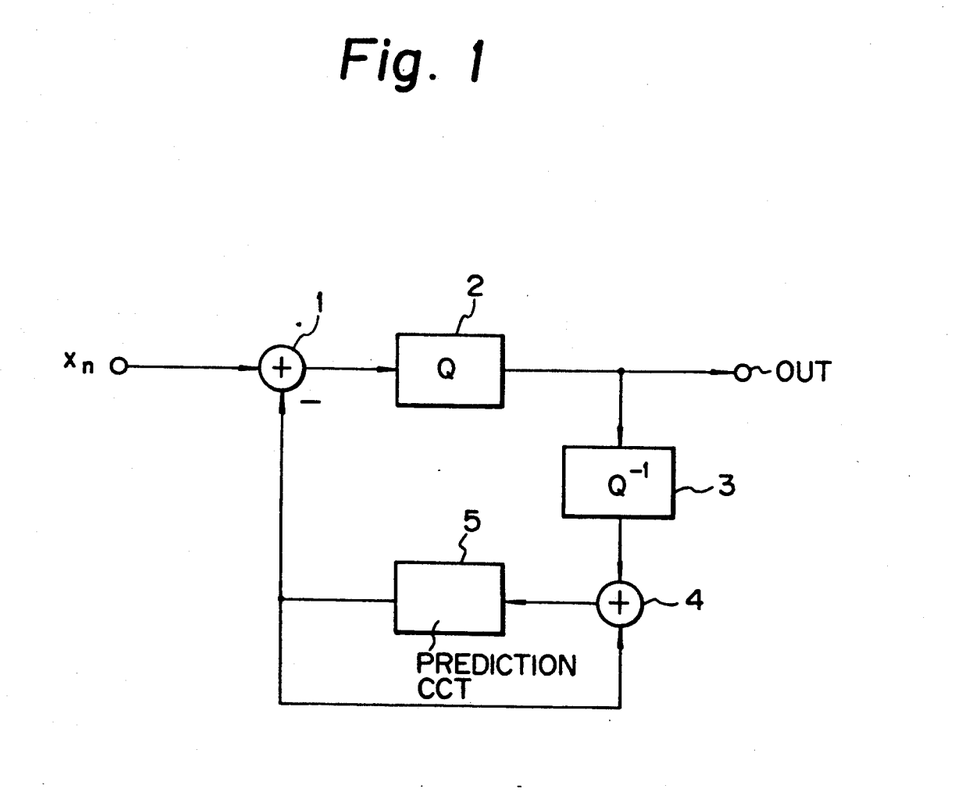
FIG. 1 is a block diagram showing a DPCM encoder.

FIG. 1 is a block diagram showing a DPCM encoder. As shown, picture element data $x_n$ corresponds to the sampled value which is consecutively obtained by the sampling of a video signal. The picture element data $x_n$ is supplied to a subtracting circuit 1 in which output data of a prediction circuit 5 is subtracted from the input data, i.e., the picture element data $x_n$. The output data of the subtracting circuit 1 constitutes the prediction error, and is supplied to a quantizing circuit 2. The quantizing circuit 2 is constructed to generate a code representing a quantization representation value obtained by quantizing the prediction error. The output of the quantizing circuit 2 is supplied to an output terminal OUT and to a representation value generating circuit 3. The representation value generating circuit 3 is constructed to generate data representing a quantization representation value (referred to as representation value hereinafter) corresponding to the supplied code data. The output of the representation value generating circuit 3 is supplied to a summing circuit 4 in which the input data is added to output data of a prediction circuit 5. The output of the summing circuit 4 is supplied to the prediction circuit 5 as a decoded value. The prediction circuit 5 is constructed to perform, for example, a one-dimensional prediction, and it supplies the output of the summing circuit 4 delayed by one sampling period, to the subtracting circuit 1 and the summing circuit 4, as a prediction value of the current picture element data $x_n$ to be converted to code data.

In the DPCM encoder having the construction described above, the quality of pictures obtained by decoding the coded video signal is greatly affected by the characteristics of the quantizing circuit 2 and the representation value generating circuit 3. For instance, if the minimum representation value of the quantizing circuit 2 is large, which in turn increases the so called granular noise which vibrate in the same variation width as the minimum representation value. If, on the other hand, the maximum representation value of the quantizing circuit 2 is small, the so called slope-overload effect is encountered in which the decoded video signal fails to track the original video signal at positions where the signal level changes rapidly.

Because of these reasons, coding schemes such as quasi-instantaneous companding DPCM, ADPCM have been developed, in which the characteristics of the quantizing circuit 2 and the representation value generating circuit 3 are varied in response to the character of image.

In the quasi-instantaneous companding DPCM, picture element data groups are divided into blocks, and the dynamic range of the prediction error in each block is calculated previously so that the characteristics of the quantizing circuit 2 and the representation value generating circuit 3 are controlled for each block by switching operations.

In the ADPCM, on the other hand, the characteristics of the quantizing circuit 2 and the representation value generating circuit 3 are controlled for each picture element by switching operations. More specifically, the ADPCM is a coding scheme such that a circuit, in which a plurality of quantizing circuits having different dynamic ranges are used as the quantizing circuit 2, and the input data is quantized by one of the plurality of quantizing circuits designated by range control data r, is provided, and the range control data r is generated for each picture element in response to the representation value of a picture element which has been converted to code data at the previous time.

In the ADPCM encoder constructed as described above, the quantizer for the picture element of the next point of time is determined only by using the prediction error of the current picture element. Therefore, a problem has been encountered that the most appropriate quantizer is not necessarily selected for each picture element, giving rise to the increase in errors between the coded picture signal and the original picture signal. Furthermore, in the ADPCM when an edge portion (leading edge or trailing edge) of the original picture signal is processed, the dynamic range of the quantizer for the next quantizer increases only after the first picture element in the edge portion is converted to a code word corresponding to a high-order representation value in a quantizer having a low dynamic range. Hence, a delay of tracking to the original picture signal is generated, causing the slope over-load effect.

OBJECT AND SUMMARY OF THE INVENTION

The present invention is based on the point described above, and an object of the present invention is to provide a method of encoding a picture signal capable of generating a coded picture signal which has less errors from the original picture signal and without delays in tracing the level change in the original picture signal.

A picture signal encoding method according to the present invention is of a prediction coding type in which a quantizing characteristic of a current picture element to be converted to a code word is controlled in response to a quantizing characteristic of at least an adjacent picture element which already has been coded and its code output, and a difference component between the value of a current picture element and a prediction value of the current picture element is quantized for coding by the above-mentioned quantizing characteristic. In the coding procedure of the above-mentioned current picture element at least one of picture elements to be coded after that instant, the control of whose quantizing characteristic is influenced by the coded output of the above-mentioned current picture element, is used as a preview picture element. Among all of combinations between a plurality of code words of above-mentioned current picture element and a plurality of code words of the above-mentioned preview picture element, a code word of the current picture element in a combination whose error estimation value determined by the quantized errors of the above-mentioned current picture element and preview picture element respectively is smallest is derived as the code output.

With the picture signal coding scheme according to the present invention, optimum quantizing characteristic and representation value are selected without delay in response to the change in dynamic range of the original picture signal, to form a code output having very small errors from the original picture signal and free from the delay in tracking the level change of the original picture signal.

DETAILED DESCRIPTION OF THE PREFERRED EMBODIMENT

The embodiment of the present invention will be described with reference to FIGS. 2 through 7 of the accompanying drawings.

For simplicity's sake, it is assumed in this embodiment that a one dimensional prediction, in which a decoded value of picture data of a previous time is used as the prediction value, is employed as the prediction method.

Figure 2:
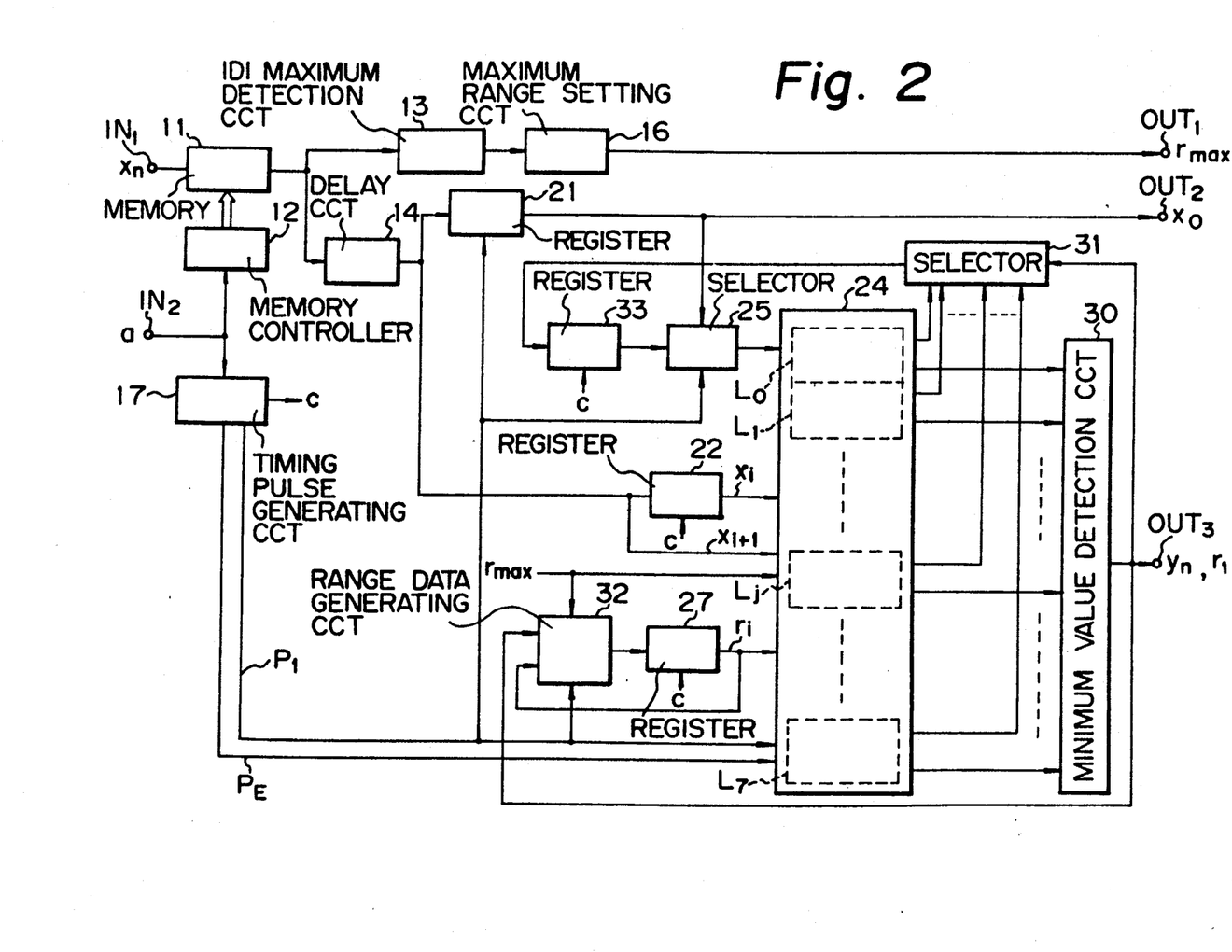
FIG. 2 is a block diagram showing an encoder according to the present invention.

As shown in FIG. 2, a digitized video signal and a clock pulse signal a synchronized with the digitized video signal are supplied to input terminals $IN_1$ and $IN_2$. The digitized video signal is then supplied to a buffer memory 11. The digitized video signal is, for example, obtained by sampling a luminance signal or a color difference signal by using sampling pulses having a frequency four times the frequency of the color subcarrier signal of the NTSC system, and converting the obtained sampled values to 8 bit data. Thus the digitized video signal corresponds to picture data representing picture elements of a picture formed by an NTSC video signal.

The buffer memory 11 has a memory capacity for storing picture element data corresponding to two frames of the video signal. Control operations for the buffer memory 11 such as the address control are performed by a memory controller 12. The memory controller 12, in turn, is constructed to perform control operations so that the picture element data is consecutively written into the buffer memory 11 by the clock pulse signal a in the order of the input of data. At the same time, the memory controller 12 performs control operations to read out, in a predetermined order, picture element data of picture elements for each of a plurality of blocks formed by dividing a picture. Each of the plurality of blocks is formed by a predetermined number of picture elements.

Picture element data read out from the buffer memory 11 is supplied to a $|D|$ maximum detection circuit 13, and also delayed by a delay circuit 14 for a period required for reading the picture data of an amount corresponding to one block. Then the picture element data is supplied to registers 21 and 22. The $|D|$ maximum detection circuit 13 is constructed to calculate an absolute value of the difference between each picture element data and picture element data supplied immediately before, i.e., the difference value, to detect the maximum one of the obtained values, and to output data representing the maximum value. Output data of the $|D|$ maximum detection circuit 13 is supplied to a maximum range setting circuit 16. The maximum range setting circuit 16 is constructed to select a quantizing characteristic having a dynamic range, which is the smallest among values greater than the absolute value of the difference value, from eight characteristics excluding the range 0.5 and the range 1.5 of the ten quantizing characteristics (from range 0 to range 7) shown in FIG. 3A in accordance with the output data of the $|D|$ maximum detection circuit 13. The selected characteristic is issued as maximum range setting data $r_{max}$.

Figure 3A:
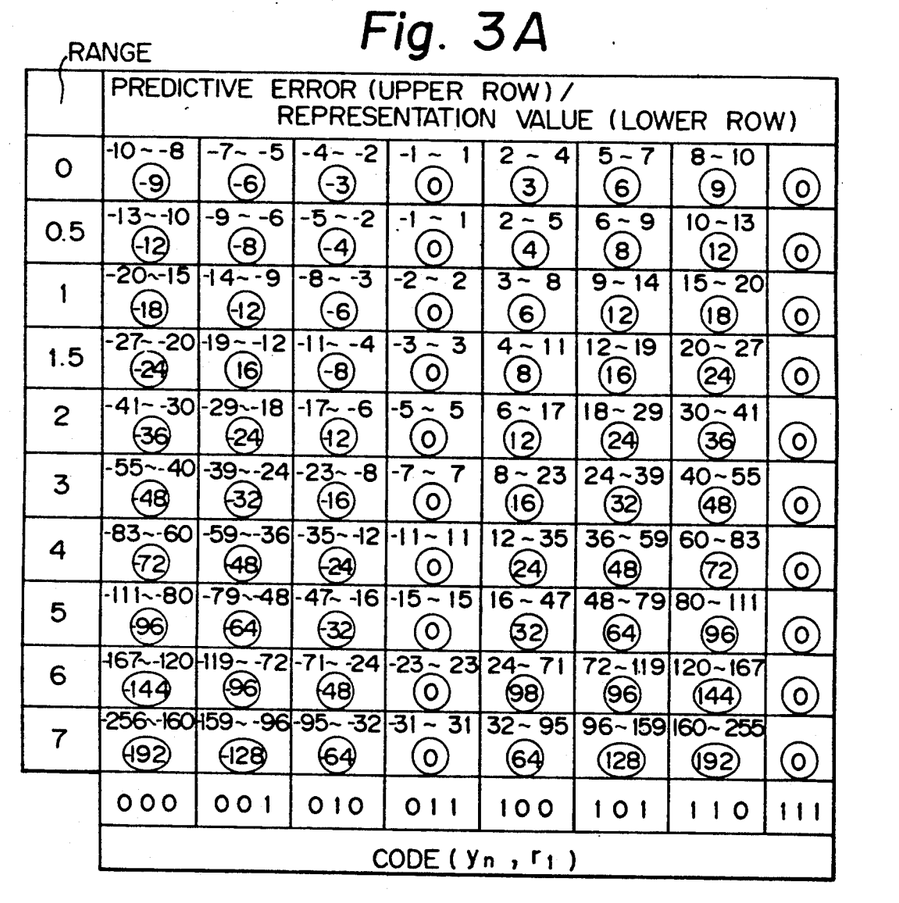
FIGS. 3A and 3B are diagrams showing the rule of generating the quantizing characteristic and range control data.

In FIG. 3A, the characteristic is shown for each of ten sorts of quantizing characteristics denoted as range 0, range 0.5, range 1.5, range 2, range 3, range 4, range 5, range 6, and range 7, respectively. All of the quantizing characteristics shown in FIG. 3A are of a midtread type characteristic, whose prediction error range obtained by dividing the dynamic range of each quantizing characteristic by seven, and the corresponding representation value are indicated. These quantizing characteristics are utilized, in a local encoder group 24, for quantizing the prediction error of each picture element, in such a manner that one of eight sorts of code words is assigned to the representation value of each of the quantizing characteristics by using 3 bit codes. These 3 bit codes are used as the coded output of the quantized prediction error. In addition, a special code word 111 is provided to the ten sort of quantizing characteristics shown in FIG. 3A for the purpose of tracking input data varying rapidly. The representation value of this special code word is indicated in the right hand column of FIG. 3A.

Thus, by employing a midtread type quantizing characteristic, the dynamic range is symmetrically divided into positive and negative parts while a residual code word is used for the purpose of the range control.

The maximum range setting data $r_{max}$ is supplied to the output terminal $OUT_1$, a range data generating circuit 32, and the local encoder group 24. Picture element data $x_n$ from the delay circuit 14 is supplied to registers 21, 22, and the local encoder group 24. An initial range setting pulse signal $p_1$ is supplied to the register 21 from a timing pulse generating circuit 17. The timing pulse generating circuit 17 outputs a timing pulse signal c synchronized with picture element data read out from the memory 11, as well as the initial range setting pulse signal $p_1$ in synchronism with the initial data of each of blocks consecutively read out from the buffer memory 11 and delayed by a delay circuit 14. The timing pulse generating circuit 17 also generates a last sample pulse signal $p_E$ in synchronism with the last data of each block.

By means of the initial range setting pulse signal $p_1$, head picture element data $x_0$ of one block is held in the register 21. The head picture element data $x_0$ held in the register 21 is supplied to the output terminal $OUT_2$. The timing pulse signal c is supplied to the register 22 from the timing pulse generating circuit 17. By means of the timing pulse signal c, each picture element data is in turn held in the register 22. As a result, picture element data $x_i$ and $x_{i+1}$, issued from the delay circuit 14 at timings different by one clock period from each other, appear at the output terminal of the register 22 and the output line of the delay circuit 14.

In the above expression, subscript letters $i$, $i+1$ indicate the order of picture elements in one block, and $i$ takes the value of $0, 1, \ldots N-1$. Furthermore, $x_n$ represents a picture element outside the block, which may take any value.

Output data of the register 22 and the delay circuit 14 are supplied to the local encoder group 24. The local encoder group 24 is made up of eight local encoders $L_0$, $L_1, \ldots L_j, \ldots L_7$ each of which is supplied with output data of the register 22 and the delay circuit 14. Furthermore, output data of a selector 25, a register, and the maximum range setting data $r_{max}$, initial range setting pulse signal $p_1$, and the last sample pulse signal $p_E$ are fed to each of the local encoders $L_0$ through $L_7$.

Each of the local encoders $L_0, L_1, \ldots L_j, \ldots L_7$ is constructed to perform the following operations. At first, the local encoder calculates, as a decoded value $\hat{x}_i^j$ of the current picture element, a sum between a j-th representation value ($j=0, 1, \ldots 7$) in one of ten quantizing characteristics range 0 through range 7 indicated by the output data of the register 27 and the prediction value $x_i^d$ of the picture element to be encoded (current picture element) $x_i$. Then the local encoder calculates, as a squared error $(\epsilon_{i+1}^j)^2$, a square of the quantized error, i.e., a difference between the decoded value $\hat{x}_i^j$ and the current picture element $x_i$. The local encoder also calculates a prediction error by subtracting the prediction value $x_{i+1}$ corresponding to the picture element to be coded next time (next picture element) from the next picture element $x_{i+1}$, and calculates the quantizing representation value by quantizing the prediction error by one of the ten quantizing characteristics range 0 through range 7 determined by j and $r_i$, and further calculates, as a squared error $(\epsilon_{i+1}^j)^2$, a square of the quantized error obtained as the difference between the quantization representation value, and the prediction error. The local encoder outputs data representing the error estimation value, i. e., a sum of the values $(\epsilon_i^j)^2$ and $(\epsilon_{i+1}^j)^2$.

The error estimation values $(\epsilon_i^j)^2 + (\epsilon_{i+1}^j)^2$ issued from each of the local encoders $L_0, L_1, \ldots L_j, L_7$, are supplied to a minimum value detection circuit 30. The minimum value detection circuit 30 outputs a code indicating a representation value by which the minimum value of the error estimation values $(\epsilon_i^j)^2 + (\epsilon_{i+1}^j)^2$ issued from each of the local encoders $L_0, L_1, \ldots L_j \ldots L_7$. This code output represents the initial range data $r_1$ when the initial range setting pulse signal $p_1$ is supplied to the local encoder 24, and in other periods it forms a code output series $y_n$ of the representation value. The output data $r_1$ and $y_n$ issued from the minimum value detection circuit 30 are supplied to a selector 31, a range data generating circuit 32, and an output terminal $OUT_3$.

Furthermore, with respect to the quantizing characteristics shown in FIG. 3A, each of the ten sorts of quantizing characteristics $0, 0.5, 1, \ldots 7$ can be employed as the quantizing characteristic for each picture element other than $r_{max}$ and $r_1$. However as will be appreciated from the foregoing explanation, only eight sorts of quantizing characteristics $0, 1, 2 \ldots 7$ can be employed for the picture elements $r_{max}$ and $r_1$. The output data $r_{max}$ at the output terminal $OUT_1$, $x_0$ at the output terminal $OUT_2$, $r_1$ and $y_n$ are processed by a modulator of the later stage, in which a time division multiplexing, a digital modulation and the addition of sync signals are performed, and in turn transmitted or recorded on a recording medium.

Data representing each of the decoded values $\hat{x}_i^0, \hat{x}_i^1, \ldots, \hat{x}_i^j \ldots, \hat{x}_i^7$ respectively issued from the local encoders $L_0, L_1, \ldots L_j \ldots L_7$ are supplied to a selector 31. The selector 31 is constructed to selectively output one of data respectively representing the decoded value $\hat{x}_i^0$, $\hat{x}_i^1, \ldots \hat{x}_i^j \ldots, \hat{x}_i^7$ in response to the code output of the minimum value detection circuit 30.

The output data of the selector 31 is supplied to a register 33. The register 33 is constructed to hold and supplies the output signal of the selector 31 in accordance with the timing pulse signal c. The output data of the register 33 is supplied to the selector 25

The selector 25 supplies the head picture element data $x_0$ held in the register 21 when the initial range setting pulse signal is supplied, and supplies the output data of the register 33 in other times. This output data is used as the prediction value $x_i^d$ for the current picture element $x_i$.

The range data generating circuit 32 is constructed to directly output the initial range data $r_1$ issued from the initial value detection circuit 30 when the initial range setting pulse signal $p_1$ is supplied, and afterwards generate a range control data $r_{i+1}$ for the next picture element by using the range control data $r_i$ issued from the register 27 and the representation value of the current picture element which is represented by the maximum range setting data $r_{max}$ and the code $y_i$ issued from the minimum value detection circuit 30.

The register 27 holds the output of the range data generating circuit 32 in accordance with the timing pulse signal c and outputs the same as the range control data $r_i$.

Figure 3B:
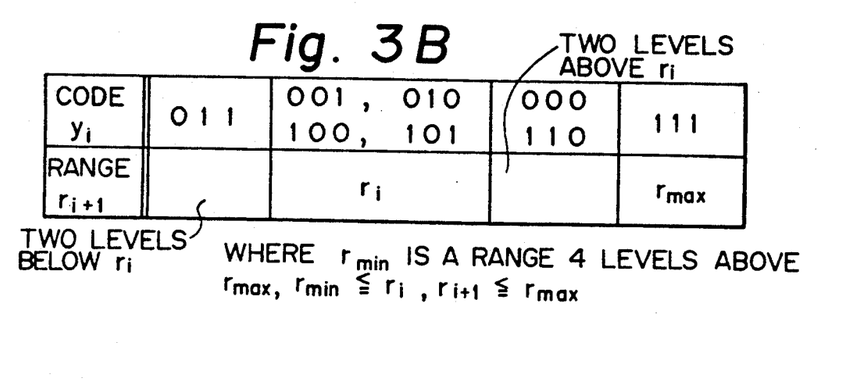

FIG. 3B shows an example of the manner of generating the range control data $r_{i+1}$ of the next picture element. The code $y_i$ represents the representation value of the current picture element $x_i$. The data $r_{i+1}$ is determined by the value of the code $y_i$ and the data $r_i$. A minimum range setting data $r_{min}$ which is four levels below the maximum range setting data $r_{max}$, as well as the data $r_{max}$ are determined previously. If the range setting data $r_{i+1}$ has a value above $r_{max}$ or a value below $r_{min}$, it is automatically replaced by $r_{max}$ or $r_{min}$ respectively. The manner of generation shown in FIG. 3B is also employed in a range control data generating circuit 42j described later, in which $y_i$ in the above explanation is replaced by j.

Figure 4:
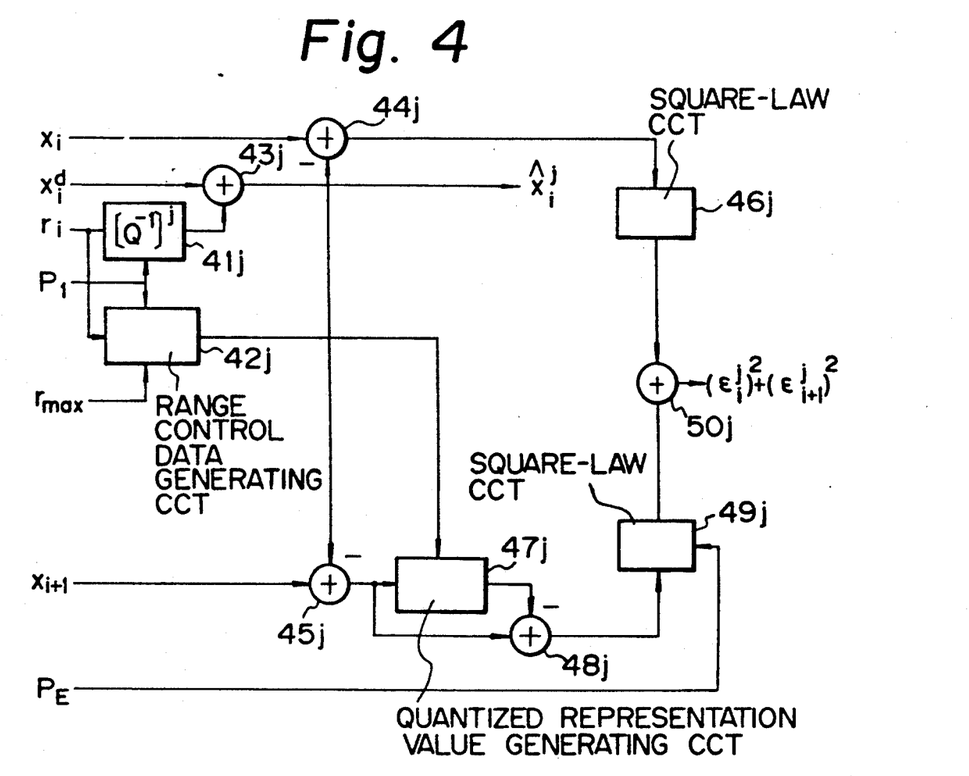
FIG. 4 is a block diagram showing a local encoder.

FIG. 4 is a block diagram showing the construction of the local encoders $L_0, L_1, \ldots L_j \ldots L_7$. As shown, the range control data $r_i$, which is derived as the output data of the register 27, is supplied to the representation value generating circuit 41j and the range control data generating circuit 42j. The initial range setting pulse signal $p_1$ is supplied to the representation value generating circuit 41j and the range control data generating circuit 42j. The representation value generating circuit 41j is constructed to output a value 0 when the initial range setting pulse signal $p_1$ is supplied, and generates a j-th representation value in one of the ranges 0 through 7 designated by the range setting data $r_i$ in other times.

The representation value issued from the representation value generating circuit $41j$ is supplied to a summing circuit $43j$ in which the representation value is added to the prediction value $x_i^d$, to form a decoded value $\hat{x}_i^j$. The decoded value $\hat{x}_i^j$ obtained as the output of the summing circuit $43j$ is supplied to the selector 31, and subtracting circuits $44j$ and $45j$ at the same time. In the subtracting circuit $44j$, the decoded value $\hat{x}_i^j$ is subtracted from the current picture element data $x_i$. The output data of the subtracting circuit $44j$, which is the quantized error of the current picture element $x_i$, is supplied to a square-law circuit $46j$ where the quantized error is squared, and in turn output as the squared error data $(\epsilon_i^j)^2$.

In the one dimensional prediction, the decoded value $\hat{x}_i^j$ forms the prediction value $x_{i+1}^{dj}$ of the next picture element, and the prediction error is generated in the subtracting circuit $45j$ by subtracting the prediction value $x_{i+1}^{dj}$ from the next picture element data $x_{i+1}$. The output data of the subtraction circuit $45j$ is supplied to a quantization representation value generating circuit $47j$ and a subtraction circuit $48j$.

The maximum range setting data $r_{max}$ is further supplied to the range control data generating circuit $42j$. The range control data generating circuit $42j$ is constructed to generate data representing a j-th quantizing characteristic, counted from the one having the narrowest dynamic range, among the eight sorts of quantizing characteristics range 0 through range 7 excluding the range 0.5 and the range 1.5 when the initial range setting pulse signal $p_1$ is supplied. In other times, the range control data generating circuit $42j$ generates data representing the quantizing characteristic of the next picture element $x_{i+1}$ which is determined, from the ten quantizing characteristics range 0 through range 7, by the range control data $r_i$ and the j-th representation value. The output data of the range control data generating circuit $42j$ is supplied to the quantization representation value generating circuit $47j$. The quantization representation value generating circuit $47j$ is constructed to perform operations of quantizing the prediction error issued from the subtraction circuit $45j$ by the quantizing characteristic represented by the output data of the range control data generating circuit $42j$, thereby generating data representing the representation value closest to the prediction error. The output data of the quantization representation value generating circuit $47j$ is supplied to a subtracting circuit $48j$. The representation value derived as the output data of the quantization representation value generating circuit $47j$ is subtracted from the prediction error which is derived as the output data of the subtracting circuit $45j$ in the subtracting circuit $48j$. The output data of the subtracting circuit $48j$ is supplied to a square-law circuit $49j$ in which the output data is squared, and issued as squared error data $(\epsilon_{i+1}^j)^2$. Furthermore, the last sample pulse signal $p_E$ is supplied to the square-law circuit $49j$. The square-law circuit $49j$ is constructed to produce "0" by resetting the result of calculation when the last sample pulse signal $p_E$ is supplied.

The squared error data $(\epsilon_{i+1}^j)^2$ issued from the square-law circuit $49j$ is supplied to a summing circuit $50j$ where it is added to the squared error data $(\epsilon_i^j)^2$ issued from the square-law circuit $46j$, and the obtained summing signal is supplied to the minimum value detection circuit 30.

Figure 5:
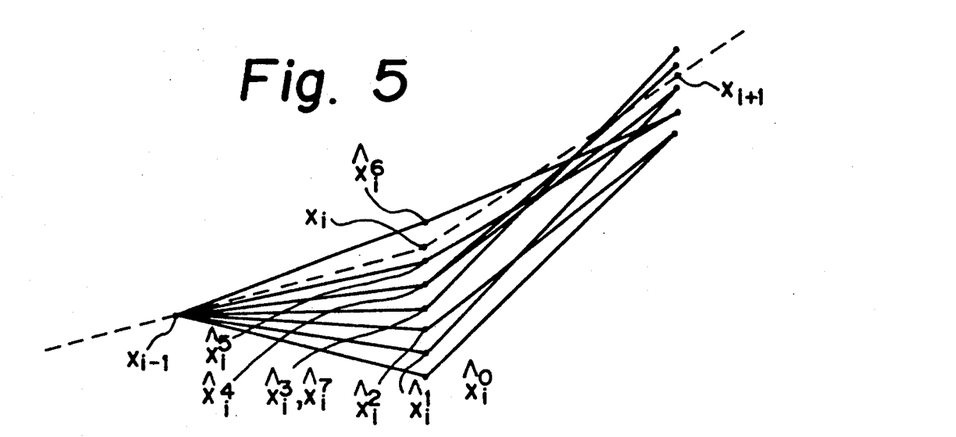
FIGS. 5 and 6 are diagrams showing the function of the apparatus shown in FIG. 2.

In the circuit construction described above, when picture data $x_{i-1}$, $x_i$, $x_{i+1}$ of successive three picture elements are read out from the buffer memory 11 and supplied to the register 22 through the delay circuit 14 as shown in FIG. 5, the following operations will take place. When the picture element data $x_i$ is supplied to the local encoders $L_0, L_1, \ldots L_j \ldots L_7$, each of decoded values $\hat{x}_i^0, \hat{x}_i^1, \ldots \hat{x}_i^j, \ldots \hat{x}_i^7$, which are obtained by the summation between the output data $x_i^d$ of the selector 25 and data representing each of eight representation values in the quantizing characteristic indicated by the range control data $r_i$ derived as the output data of the register 27, is generated in each of the local encoders $L_0, L_1, \ldots L_j \ldots L_7$. Subsequently, each of the decoded values $\hat{x}_i^0, \hat{x}_i^1, \ldots \hat{x}_i^j, \ldots \hat{x}_i^7$ is subtracted from the current picture element data $x_i$, and the obtained quantized error is squared. Through these operations, square error data $(\epsilon_i^0)^2, (\epsilon_i^1)^2, \ldots (\epsilon_i^j)^2, \ldots (\epsilon_i^7)^2$ are obtained-while the prediction errors are derived by quantizing each of the representation values in the quantizing characteristics indicated by the range control data $r_i$ while the current picture element data is coded by the predictive encoding.

At the same time, in each of the local encoders $L_0, L_1, \ldots L_j \ldots L_7$, each of the decoded values $\hat{x}_i^0, \hat{x}_i^1, \ldots \hat{x}_i^j, \ldots \hat{x}_i^7$ is treated as a prediction value $x_{i+1}^{d1}, \ldots x_{i+1}^{dj}, \ldots x_{i+1}^{d7}$ of the next picture element data $x_{i+1}$, and eight prediction errors are derived by subtracting each of the prediction values $x_{i+1}^{d1}, \ldots x_{i+1}^{dj} \ldots x_{i+1}^{d7}$ from the next picture element data $x_{i+1}$. Subsequently, each of the eight prediction errors is quantized by each of eight quantizing characteristics determined by $r_i$ and $j$, to generate eight representation values.

As will be appreciated from FIG. 3B, the same quantizing characteristic exists in the eight quantizing characteristics, and the representation values are such values obtained by selecting one of the eight representation values whose deviation from the prediction error is the smallest in each of the eight quantizing characteristics. Each of the eight representation values is subtracted from each of the prediction errors, and the obtained quantized error is squared, so that the squared error data $(\epsilon_{i+1}^0)^2, (\epsilon_{i+1}^{12}, \ldots (\epsilon_{i+1}^j)^2, \ldots (\epsilon_{i+1}^7)^2$ in the case where the prediction error of the next picture element data $x_{i+1}$ is quantized by the quantizing characteristic determined $r_i$ and $j$, are generated.

Then, the summation between each of the squared error data $(\epsilon_i^0)^2, (\epsilon_i^1)^2, \ldots (\epsilon_i^j)^2, \ldots (\epsilon_i^7)^2$ and each of the squared error data $(\epsilon_{i+1}^0)^2, (\epsilon_{i+1}^1)^2, \ldots (\epsilon_{i+1}^j)^2, \ldots (\epsilon_{i+1}^7)^2$ are supplied to the minimum value detection circuit 30 as the error estimation value, and a code word representing the representation value corresponding to the minimum one of the eight error estimation values is issued as a code $y_i$ corresponding to the current picture element data $x_i$.

As a result, one combination having the smallest error estimation value which corresponds to the difference between the decoded value of each picture element corresponding to each code word and the original picture value, is selected from 64 combinations between eight code words of the current picture element respectively representing the representation values in the quantizing characteristic indicated by the range control data $r_i$ and eight code words of eight next picture elements representing the representation value in each of the representation values in the quantizing characteristics of the eight next picture elements respectively corresponding to the eight code words of the current picture element. The code word in the selected combination becomes the code output corresponding to the current picture element data $x_i$. Therefore, optimal quantizing characteristic and representation value are selected in response to the change in the dynamic range of the original picture signal, so that the error of the coded picture signal with respect to the original picture signal is minimized.

Figure 6:
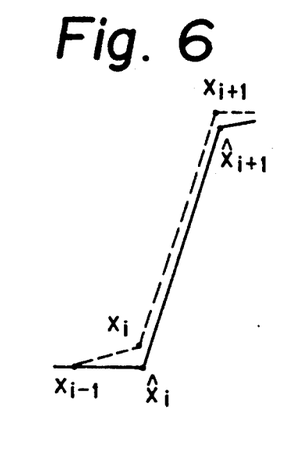

As mentioned before, provision of a special code word corresponding to rapidly changing input data is made to each quantizing characteristics. The representation value of this special code word is 0, and when the special code word is used as the code of the present picture element the code of the next picture element represents the representation value in one of the ten quantizing characteristics indicated by the maximum range setting data $r_{max}$. Therefore, when the original picture signal has a steep edge as shown by the dashed line in FIG. 6, the prediction error of the current picture element data $x_i$ is coded into the special code word, and the prediction error of the next picture element data $x_{i+1}$ is coded by the quantizing characteristic indicated by the maximum range setting data $r_{max}$. As a result, the difference between the decoded value $\hat{x}_i$ corresponding to the current picture element $x_i$ and the decoded value $\hat{x}_{i+1}$ corresponding to the next picture element $x_{i+1}$ can be made sufficiently large, so that a good traceability against steep edges of the picture signal is attained.

Furthermore, it is to be noted that the code words of the next picture element are used only for the purpose of the estimation of the quantized error, and are abandoned without being used as the data code output of the next picture element $x_{i+1}$. The coding procedure of the next picture element data $x_{i+1}$ is performed in the same manner as described above, in which the next picture element data $x_{i+1}$ is regarded as the current picture element data and $_{i+1}$, $_{i+2}$ are respectively replaced by $_i$ and $_{i+1}$.

When the coded output $y_i$ of the current picture element data $x_i$ is fixed, signals in the circuit shown in FIG. 2 are placed in the following states by means of the timing pulse signal c. The fixed decoded value $\hat{x}_i$ supplied from the selector 31 is held in the register 33, and in turn supplied to the local encoder group 24 through the selector 25 as the prediction value $x_{i+1}^d$ of the next picture element $x_{i+1}$. Then, the range data generating circuit 32 generates the range setting data $r_{i+1}$ of the next picture element $x_{i+1}$ in accordance with the rule of generation shown in FIG. 3B, by using $r_i$, $y_i$, and $r_{max}$. The generated range setting data $r_{i+1}$ is held in the register 27, and supplied to the local encoder group 24. Furthermore, $x_{i+1}$ and $x_{i+2}$ respectively from the register 22 and the delay circuit 14 are supplied to the local encoder group 24. In this state, coding of $x_{i+1}$ is performed in the same manner as the coding of $x_i$ as described before, so that a coded output $y_{i+1}$ is produced. Afterwards, coding is performed in the same manner for $x_{i+2}, x_{i+3}, \ldots x_{N-1}$ consecutively. In the coding of the last picture element $x_{N-1}$ in the block, the output of the delay circuit 14 is not fixed, and the representation value is determined so that the squared error $(\epsilon_{N-1}{}^j)^2$ of the last picture element $x_{N-1}$ becomes lowest, since the output of the square-law circuit $49j$ in each local encoder is rendered to be equal to 0 by the last sampling pulse $p_E$. Conversely, in determining the initial range data $r_1$, the output of the square-law circuit $46j$ is rendered to be equal to 0, since a condition expressed by the equation $x_i = x_i^d = \hat{x}_i^j = x_0$ is satisfied by the initial range setting pulse signal $p_1$ in each of the local encoders. In this state, the range control data generating circuit $42j$ designates a j-th quantizing characteristic to the quantization representation value generating circuit $47j$, thereby the prediction error of $x_1$ is quantized, and the square of the quantized error of $x_1$ is calculated by the square-law circuit $49j$, and this value is issued from the summing circuit $50j$. Therefore, one quantizing characteristic in which the quantized error in coding $x_1$ has the minimum value is determined among eight quantizing characteristics $0, 1, \ldots j \ldots 7$ by means of the minimum value detection circuit 30, and this data is output as $r_1$.

Figure 7:
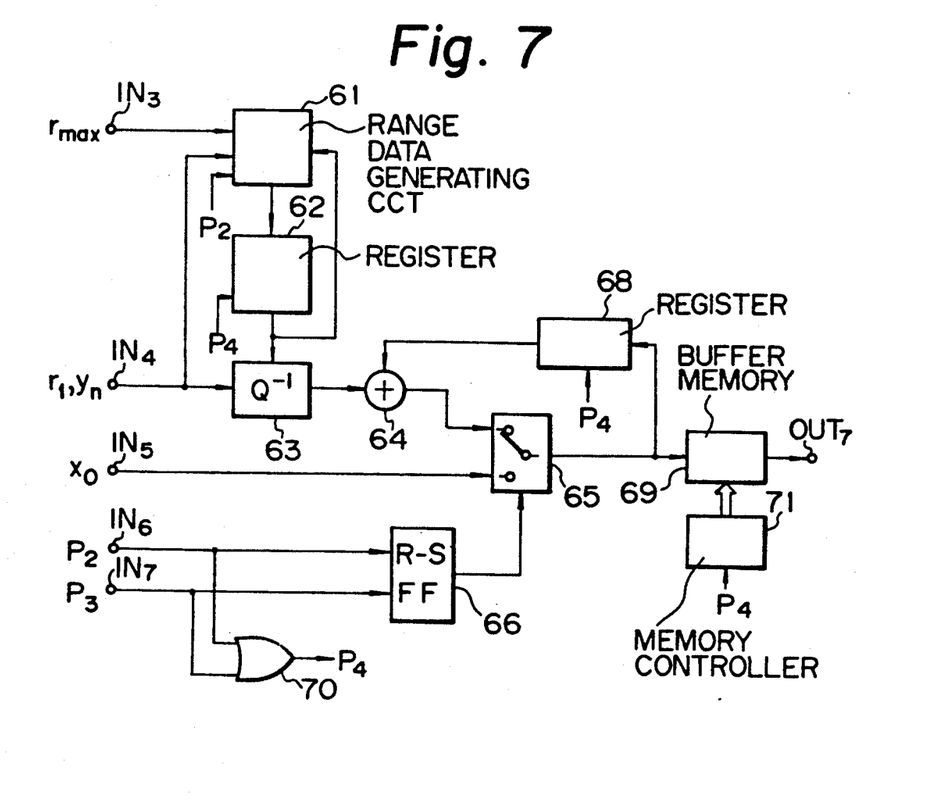
FIG. 7 is a block diagram showing a decoder for performing the decode process of data encoded by the apparatus shown in FIG. 2.

FIG. 7 is a block diagram showing a decoder for decoding the code words generated by the encoding scheme according to the present invention. A coded picture signal received in a tuner or retrieved from a recording medium is demodulated by a demodulator provided in a stage before the decoder. By the demodulator, operations such as the separation of each multiplexed data, and the generation of various timing signals are performed, and those data and signals are supplied to input terminals $IN_3$ through $IN_7$ of the decoder. In the figure, an initial setting pulse signal $p_2$ is a signal indicating the period in which the initial range data $r_1$ is supplied to $IN_4$, and the timing pulse signal $p_3$ is a pulse signal synchronized with $y_n$. The maximum range setting data $r_{max}$ is supplied to a range data generating circuit 61 through the input terminal $IN_3$. The initial range data $r_1$ and the code $y_n$ are supplied to the range data generating circuit 61 through the input terminal $IN_4$. The range data generating circuit 61 outputs the initial range data $r_1$ when the initial setting pulse signal $p_2$ is supplied through the input terminal $IN_6$, and in other times generates range control data determined by $r_{max}$, $y_n$, and the output of the register 62. The register 62 is constructed to hold the range control data which is consecutively supplied from the range data generating circuit 61 in response to an output pulse signal $p_4$ of a logical OR gate 70 which receives the initial setting pulse signal $p_2$ and the timing pulse signal $p_3$. The code $y_n$ is also supplied to a representation value generating circuit 63.

The representation value generating circuit 63 is constructed to generate a representation value corresponding to the code $y_n$ in a quantizing characteristic indicated by the output data of the register 62. The representation value, i.e., the output of the representation value generating circuit 63, is supplied to a summing circuit 64, and added to a prediction value issued from the register 68. The output data of the summing circuit 64 is supplied to one of two input terminals of a change-over switch 65, as a decoded value $\hat{x}_n$. The head picture element data $x_0$ is supplied to the other input terminal of the change-over switch 65 through the input terminal $IN_5$. A Q output signal of an R-S flip-flop 66 is supplied to a control input terminal of the change-over switch 65. The initial setting pulse signal $p_2$ is supplied to a set input terminal of the R-S flip-flop 66, and the timing pulse signal $p_3$ is supplied to a reset input terminal of the R-S flip-flop 66. The change-over switch 65 is constructed to selectively output the head picture element data $x_0$ when the signal at the control input terminal has a high level, and selectively output the decoded value $\hat{x}_n$ when the signal at the control input terminal has a low level.

Therefore, at the start of decoding process of picture element data of each block the head picture element data $x_0$ is issued from the change-over switch 65, and subsequently the decoded value $\hat{x}_n$ is issued in accordance with the timing pulse signal $p_3$ which is supplied together with the code $y_n$. The output signal of the change-over switch 65 is supplied to a register 68 and a buffer memory 69. The register 68 is constructed to hold the output data of the change-over switch 65 as the prediction value in the one dimensional prediction in accordance with the output pulse signal $p_4$ of the logical OR gate 70.

The buffer memory 69 has a storage capacity for storing picture element data corresponding to two frame periods of a picture signal as in the case of the buffer memory 11, and control operations such as the address control thereof are performed by a memory controller 71 which is also constructed in the same manner as the memory controller 12. A decoded picture signal is issued from the buffer memory 69 and supplied to an output terminal $OUT_7$.

In the construction described above, when the initial range data $r_1$, head picture element data $x_0$, and initial setting pulse signal $p_2$ are respectively supplied through the input terminals $IN_4$, $IN_5$, and $IN_6$, the range data generating circuit 61 produces the initial range data $r_1$, which in turn is held in the register 62. The head picture element data $x_0$ is stored in the buffer memory 69, and at the same time held in the register 68 as the prediction value $x_1^d$ of the next picture element $x_1$. Then, when a code $y_1$ corresponding to the picture element $x_1$ is supplied through the input terminal $IN_4$, the representation value generating circuit 63 generates a representation value determined by the quantizing characteristic corresponding to the initial range data $r_1$ and the code $y_1$, and the decoded value $\hat{x}_1$ is produced at the summing circuit 64 by the summation between the representation value and the prediction value $x_1^d$. The decoded value $\hat{x}_1$ is stored in the buffer memory 69 and held in the register 68 as the prediction value $x_2^d$ of the next picture element $x_2$. The range data generating circuit 61 generates a range data $r_2$ which is determined by the initial range data $r_1$ supplied as the output of the register 62 and the maximum range setting data $r_{max}$, and the code $y_i$. The range data $r_2$ is held in the register 62 as data indicating the quantizing characteristic of the picture element $x_2$. Subsequently, the decoding of picture elements $x_2, x_3 \ldots x_{N-1}$ is performed in the same manner, and the decoded values of these elements are stored in the buffer memory 69. The head picture element data $x_0$ stored in the buffer memory 69 and the decoded values $\hat{x}_1, \hat{x}_2, \ldots \hat{x}_N$ are consecutively read-out and output through the output terminal $OUT_7$.

In the embodiment described above, code words whose representation value is 0 and in which the range setting data of the next picture element is set to $r_{max}$ are provided in each quantizing characteristic. However, it is also possible to provide a plurality of code words having representation values different from each other, in which the range setting data of the next picture element is set to $r_{max}$. In such a case, the quantized error can be made further smaller, since the representation value of the current picture element can be selected from a plurality of values while the quantizing characteristic of the next picture element is set to $r_{max}$. Furthermore, it is also possible to provide a code word which renders the range setting data of the next picture element to be data other than $r_{max}$, as a special code word for controlling the quantizing characteristic.

Furthermore, although each of the quantizing characteristics in the described embodiment is of the mid-tread type, the process of the present invention can be applied also to the midriser type characteristics except a point that the residual code word of N bit codes is used for the control of quantizing characteristics. In addition, although the code length and the number of code words are the same in all of the quantizing characteristics in the described embodiment, these values may be set variable. For instance, the code length and the number of code words may be increased for quantizing characteristics of larger dynamic range, so as to make narrower the pitch of the representation values. With such a feature, the quantized error can be made smaller, and more fine control of the quantizing characteristic can be performed.

It is to be noted that the application of the present invention is not limited to the prediction method. For example, although the prediction value of each picture element data is obtained by the one dimensional prediction in the described embodiment, the present invention can be applied to cases where the prediction value of each picture element is obtained by a two dimensional prediction or a three dimensional prediction.

In the described embodiment, the code word of the current picture element in a combination which has the smallest error estimation value among all of the combinations of the code words is derived as the code output only by using the current picture element and the next picture element. However, a plurality of picture elements, including the next picture element, to be coded after the current picture element may also be used as the preview picture elements. In such a case, a code word of the current picture element in a combination having the smallest error estimation value, which is determined by the current picture element and the preview picture element, among all combinations of the current picture element and the plurality of preview picture elements is derived as the code output. When the number of the preview picture elements is increase, the quantized error will be further reduced for the picture as a whole. However, the scale of the circuit will also be exponentially enlarged as the increase in number of the preview picture element.

As specifically described in the foregoing, in the coding picture signal according to the present invention at least one of picture elements to be coded subsequently, the control of whose quantizing characteristics is influenced by the coded output of the current picture element, is used as a preview picture element during the coding of the current picture element. Among all of combinations between a plurality of code words of the picture element and a plurality of code words of each picture element of the preview picture element, a code word of the current picture element in a combination whose error estimation value determined by the quantized error of the current picture element and the quantized error of the preview picture element is smallest is derived as the code output.

Accordingly in the picture signal encoding method according to the present invention, the most appropriate quantizing characteristic and representation value are selected with out delay in response to the change in dynamic range of the original picture signal, so that a coded output having a very small error from the original picture signal and free of the delay in tracking the level change of the original picture signal is obtained.

What is claimed is:

1. A picture signal encoding method of a predictive encoding type that sequentially encodes picture elements such that a current picture element being encoded is preceded by a previous, already encoded, picture element and is followed by one or more next picture elements that are yet to be encoded, said method comprising the steps of:

for a current picture element to be encoded, generating a plurality of error data values from a plurality of decoded values of the current picture element;

generating a plurality of predicted error data values from a value of a next picture element and from the plurality of decoded values of the current picture element;

summing individual ones of the plurality of error data values with a corresponding individual one of the plurality of predicted error data values to obtain a plurality of error estimation values; and generating a code word for encoding the current picture element by selecting a minimum one of the plurality of error estimation values.

2. A method as set forth in claim 1 wherein the step of generating the plurality of error data values from the plurality of decoded values of the current picture element includes the steps of:

generating the plurality of decoded values each of which is obtained b a summation of a value of the current picture element and data representing one of a plurality of representation values;

subtracting each of the decoded values from the value of the current picture element to obtain, for each of the decoded values, a first plurality of quantized error values; and squaring each of the plurality of quantized error values to obtain the plurality of error data values.

3. A method as set forth in claim 1 wherein the step of generating the plurality of predicted error data values from the value of a next picture element and from the plurality of decoded values of the current picture element includes the steps of:

generating the plurality of decoded values each of which is obtained by a summation of a value of the current picture and data representing one of a plurality of representation values;

subtracting each of the decoded values from the value of the next picture element to obtain, for each of the decoded values, a plurality of prediction errors;

generating a plurality of representation values by quantizing, in accordance with a predetermined quantizing characteristic, each of the plurality of prediction errors;

subtracting each of the plurality of representation values from a corresponding one of the plurality of prediction errors to obtain a second plurality of quantized error values; and squaring each of the second plurality of quantized error values to obtain the plurality of predicted error data values.

4. A method as set forth in claim 1 and including an initial step of selecting a quantizing characteristic from a plurality of quantizing characteristics, the selected quantizing characteristic having a dynamic range that is greater than an absolute value of a difference between a value of the current picture element and a value of the preceding picture element.

5. A method as set forth in claim 1 and further including a step generating a predetermined range control signal for the next picture element as a function of the generated code word for the current picture element.

6. A method as set forth in claim 4 wherein the plurality of quantizing characteristics include first code words each of which is formed by dividing dynamic ranges of the quantizing characteristics such that no quantizing characteristic overlaps another quantizing characteristic, the plurality of quantizing characteristics further including second code words for indicating that a quantizing characteristic for a next picture element is to have a predetermined maximum dynamic range.

7. A method as set forth in claim 4 wherein the plurality of quantizing characteristics are of a midtread type each having a dynamic range that is symmetrically divided into positive and negative parts.

8. A picture signal encoding apparatus of a predictive encoding type that sequentially encodes picture elements such that a current picture element being encoded is preceded by a previous, already encoded, picture element and is followed by one or more next picture elements that are yet to be encoded, comprising:

means for providing picture elements to be encoded;

means for generating a plurality of error data values from a plurality of decoded values of a current picture element;

means for generating a plurality of predicted error data values from a value of a next picture element and from the plurality of decoded values of the current picture element;

means for summing individual ones of the plurality of error data values with a corresponding individual one of the plurality of predicted error data values to obtain a plurality of error estimation values; and means for generating a code word for encoding the current picture element, said generating means including means for selecting a minimum one of the plurality of error estimation values.

9. Apparatus as set forth in claim 8 wherein said means for generating the plurality of error data values from the plurality of decoded values of the current picture element includes:

means for generating the plurality of decoded values including means for summing a value of the current picture element and data representing one of a plurality of representation values;

means for subtracting each of the decoded values from the value of the current picture element to obtain, for each of the decoded values, a first plurality of quantized error values; and means for squaring each of the plurality of quantized error values to obtain the plurality of error data values.

10. Apparatus as set forth in claim 8 wherein said means for generating the plurality of predicted error data values from the value of a next picture element and from the plurality of decoded values of the current picture element includes:

means for generating the plurality of decoded values including means for summing a value of the current picture element and data representing one of a plurality of representation values;

means for subtracting each of the decoded values from the value of the next picture element to obtain, for each of the decoded values, a plurality of prediction errors;

means for generating a plurality of representation values by quantizing, in accordance with a predetermined quantizing characteristic, each of the plurality of prediction errors;

means for subtracting each of the plurality of representation values from a corresponding one of the plurality of prediction errors to obtain a second plurality of quantized error values; and means for squaring each of the second plurality of quantized error values to obtain the plurality of predicted error data values.

11. Apparatus as set forth in claim 8 and further including means for selecting a quantizing characteristic from a plurality of quantizing characteristics, said selecting means being responsive to an output of means for determining an absolute value of a difference between a value of the current picture element and a value of the preceding picture element such that the selected quantizing characteristic has a dynamic range that is greater than the determined absolute value.

12. Apparatus as set forth in claim 8 and further including means for generating a predetermined range control signal for the next picture element as a function of the generated code word for the current picture element.

* * * * *